United States Patent Office 3,588,941
Patented June 29, 1971

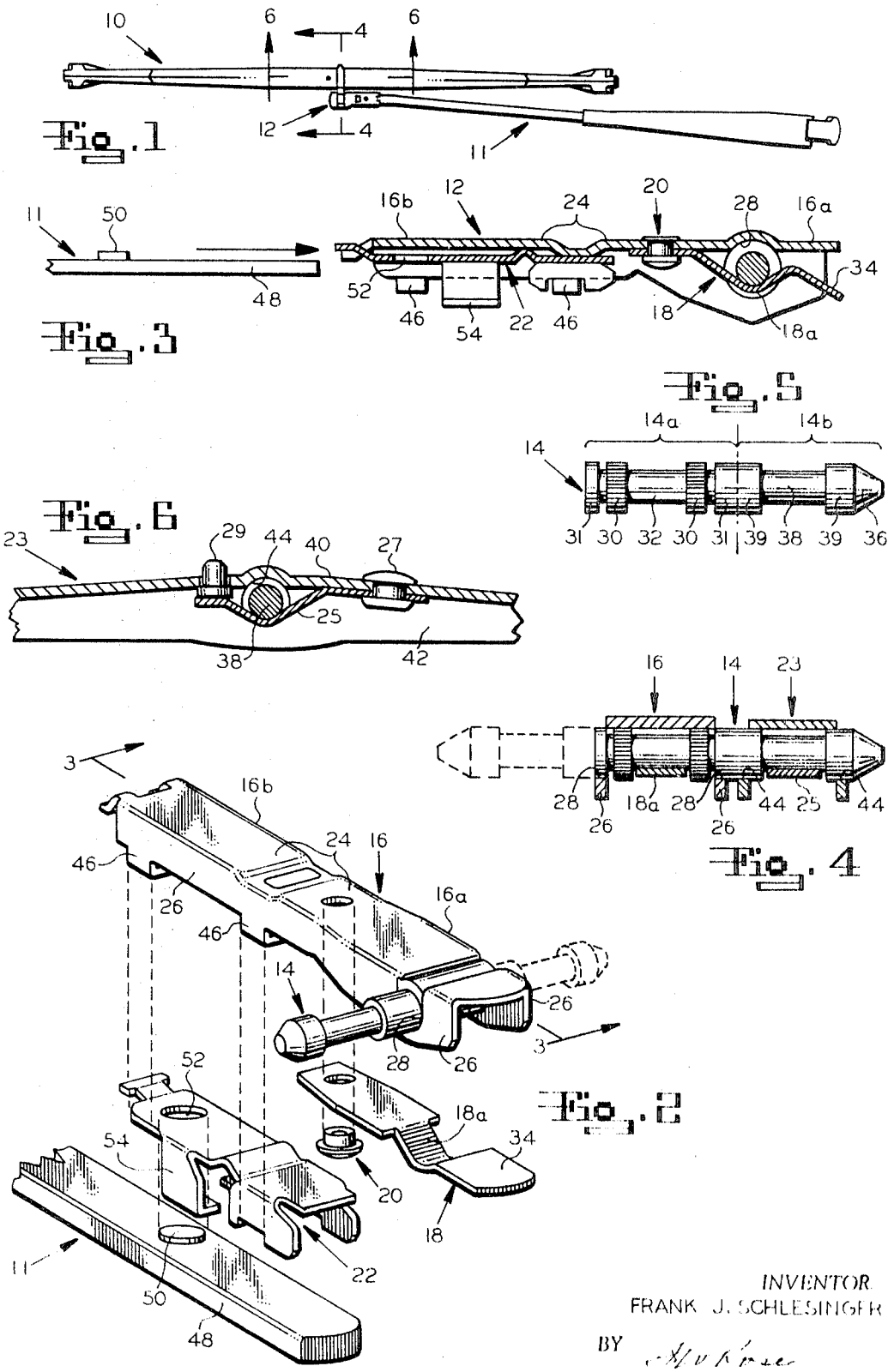

3,588,941
CONNECTOR FOR WINDSHIELD WIPER BLADE AND ARM
Frank J. Schlesinger, Merrillville, Ind., assignor to
The Anderson Company
Filed Feb. 16, 1970, Ser. No. 11,380
Int. Cl. A47l *1/00;* B60s *1/40*
U.S. Cl. 15—250.32                                            1 Claim

ABSTRACT OF THE DISCLOSURE

A connector adapted to connect a windshield wiper blade and an arm, the blade having aligned apertures in the sides of the uppermost portion of the arm pressure distributing assembly, which uppermost portion is adapted to receive a pin which is releasably maintained against transverse displacement, and the arm having a straight outermost end portion having an abutment thereon. The connector has, at its forward portion, a pin which has an outer portion that extends transversely outwardly so that it can enter the uppermost portion of the arm pressure distributing assembly of the blade and be engaged releasably therein. The inner portion of the pin is releasably held so that the direction in which the outer portion extends outwardly can be reversed. The straight end of the arm can be inserted in the aft end of the connector and is releasably held therein.

BACKGROUND OF THE INVENTION

Field of the invention

This invention relates to an improvement in connecting windshield wiper blades and arms and, more particularly, to an improved connector for connecting a windshield wiper blade and arm, the blade being adapted to releasably receive a transversely extending pin and the arm having a straight end with an abutment thereon.

Brief description of the prior art

In recent years there has been an increasing use of windshield wiper blades in which the wiper arm is connected to the blade in side-by-side relationship. The side-by-side relationship of the arm and blade reduces the total height of the arm-blade assembly (i.e., results in a "low silhouette") that permits the arm-blade assembly to enter and park in the narrow aperture formed by a raised cowl at the rear of an automobile hood. Such arm-blade assemblies, typically shown in U.S. Pat. 3,378,874, issued Apr. 23, 1968, are referred to in the trade as "hidden" windshield wipers.

The wiper blade of such arm-blade assemblies typically has an arm pressure distributing assembly whose uppermost portion has aligned apertures in the sides thereof. The aligned apertures are adapted to receive a pin which extends through the apertures and which is releasably maintained against transverse displacement with respect to the apertures. Such blades (called "pin-type" blades) are now used with arms having pins fixedly secured to the ends thereof (called "pin-type" arms). However, there are many cars on the road today that do not have pin-type arms but instead have arms of the type that have an outer straight end portion of rectangular cross-section, the end portion having an abutment thereon which is adapted to be locked in a connecting device. Such arms are frequently referred to as "straight-end" arms. However, there is presently no way by which a straight-end arm can be connected to a pin-type blade.

SUMMARY OF THE INVENTION

The invention is directed to a device (hereinafter referred to as a connector) for connecting pin-type blades and straight-end arms of the types described above. The connector comprises an integral member whose forward portion is shaped and constructed so that a portion of a pin may be releasably secured therein with another portion of the pin extending transversely outward a substantial distance. The outwardly extending portion of the pin is shaped to enter the aligned apertures of a pin-type blade, there to be releasably maintained by the blade against transverse displacement. The forward portion of the connector includes means which releasably hold the portion of the pin thereon so that the pin can be removed and reversed so that the outwardly extending portion is on the other side of the connector. The aft portion of the integral member is shaped and constructed to receive the end of a straight end wiper arm. The aft portion of the connector includes resilient means adapted to cooperate with the aft portion of the integral member to maintain an abutment on a straight-end arm releasably in locked position within the aft portion of the integral member.

BRIEF DESCRIPTION OF THE DRAWINGS

FIG. 1 is a top view of a windshield wiper assembly which includes a wiper blade, a wiper arm and a connector embodying the present invention, the connector joining the blade and the arm in side-by-side relation;

FIG. 2 is an enlarged exploded view of a connector embodying the present invention, together with the outermost end of the arm and also showing, in dotted lines, an alternate position of the pin which connects to the blade;

FIG. 3 is a cross-sectional view of the connector of FIG. 2, after assembly, taken along the lines 3—3 and showing the end of the arm in position to enter the connector;

FIG. 4 is an enlarged cross-sectional view showing the connection of the forward portion of the connector with the blade, taken along the lines 4—4 of FIG. 1 and also showing, in dotted lines, an alternate position of the pin which connects to the blade;

FIG. 5 is an enlarged view of the pin;

FIG. 6 is a fragmentary enlarged cross-sectional view taken along the lines 6—6 of FIG. 1, illustrating the releasable pin connection to the blade.

DESCRIPTION OF THE PREFERRED EMBODIMENT

In FIG. 1 there is shown a windshield wiper assembly, referred to commercially as a wiper blade, indicated generally at 10, a windshield wiper arm indicated generally at 11 and a connector indicated generally at 12. As is understood by the art, such blades may be of various types but in general comprise an arm pressure distributing assembly or superstructure connected to a resilient blade element or member. Similarly, the arm may be of various types but generally is adapted to be attached to an oscillating pivot shaft and to resiliently urge the wiper blade towards the windshield. Blade 10 is a pin-type whose arm pressure distributing assembly has an uppermost portion, described more fully below, which is adapted to receive a pin which is releasably maintained against transverse displacement, and the arm 11 has a straight outermost end portion having an abutment thereon.

Connector 12 comprises a generally cylindrical pin 14 and a formed integral member or elongate housing 16, a leaf spring 18, a rivet 20 and a resilient or spring-like member 22.

The connecting portion 23 of the wiper blade 10 consists of leaf spring 25, a rivet 27 and a button 29.

The elongate housing 16 has a forward portion 16*a* and an aft portion 16*b* (see FIG. 2). The forward portion 16*a* and aft portion 16*b* of housing 16 are channel-shaped with a top wall 24 and depending side walls 26. Depending side walls 26 have, in the forward portion 16a, aligned apertures 28 in which are positioned sections 31 of inner portion 14a of generally cylindrical pin 14. The middle or median section 32 of the inner portion 14a of pin 14 is a cylindrically shaped section of reduced diameter. On both sides of middle section 32 are sections of larger diameter 30. The middle part 18a of leaf spring 18 is narrower than middle section 32 so that when the spring resiliently presses against the middle section 32, the pin sections 30 act as shoulders and prevent transverse displacement of the pin. Leaf spring 18 is fixedly held in one end to the top wall 24 of housing 16 by rivet 20. However, the other end 34 of the spring 18 is free so that it can be pressed downwardly and pin 14 removed from apertures 28. The pin 14 can be reversed and inserted in housing 16 in the position shown by the dotted lines in FIGS. 2 and 4. This permits the connector to be used with either "right hand" or "left hand" blades (i.e., the connector permits connection of the blade to either side of the arm).

The outer portion 14b of pin 14 extends transversely outward (i.e., it extends in a direction perpendicular to the longitudinal axis of the connector and that of the blade) and has a conical shaped head or end 36 and a median cylindrically shaped section or part of reduced diameter 38 (i.e., part 38 has a substantially smaller diameter than the adjacent cylindrical sections 39).

The uppermost portion of wiper blade 10 has a connecting portion, indicated generally at 23, which has a top wall 40 and depending side walls 42 that have side openings or aligned apertures 44 for the insertion of the outer portion 14b of pin 14. Cylindrical sections 39 of the pin 14 have diameters slightly less than those of aligned apertures 44. During the insertion of the pin in the blade connecting portion 23, the pin displaces leaf spring 25 which thereafter springs back and engages the median portion 38 of pin 14 so as to hold the pin against transverse displacement. Leaf spring 25 is fixedly held to top wall 40 at one end by rivet 27 but is depressible by button 29. The pin 14 may be removed from the blade connecting portion 23 by depressing button 29 and, consequently, spring 25 far enough to permit withdrawal of the pin. In operation, the cylindrical sections 39 can rotate in the apertures of the blade connecting portion 23 so that blade 10 can pivot about the axis of pin 14.

The aft portion 16b of member 16 has a channel shape with a top wall 24 and depending side walls 26 and the bottom portions or supports 46. Housed within the channel-shaped aft portion is a resilient or spring-like member 22, which, as can be seen from FIGS. 2 and 3, is shaped or disposed so that it interlocks with the aft portion 16b of member 16 so as to be retained therein. The end or terminal portion 48 of arm 11 is of generally rectangular cross-section and has a projection or abutment 50 thereon. When the end 48 of the arm 11 is inserted in the aft portion of the connector, abutment 50 engages aperture 52 of spring member 22 so that it is locked in the connector and is held in this locked position by supports 46. Spring member 22 has a leg 54 that projects downwardly and is accessible to manual manipulation. When leg 54 is pressed upwardly, aperture 52 is disengaged from abutment 50 and end 48 of the arm 11 can retract through supports 46 and be withdrawn from the connector.

It will, of course, be understood that various details of construction may be varied without departing from the principles of this invention, and it is, therefore, not the purpose to limit the patent granted herein otherwise than necessitated by the scope of the appended claim.

What is claimed is:

1. A connector adapted to connect a windshield wiper blade of the type in which the uppermost portion of the arm pressure distributing assembly has a top and depending sides and aligned apertures in the sides, said blade being adapted to receive a generally cylindrical pin extending on both sides of said apertures and having means to releasably maintain said pin against transverse displacement and a wiper arm having a straight outermost end portion having a rectangular cross-section, said end portion having an abutment thereon, said connector comprising a pin and a formed integral member having a channel-shaped forward portion having a top wall and depending side walls, the aft portion of said member comprising a housing having connected top, bottom and side portions and being adapted to receive the outermost end portion of the arm, resilient means carried by the aft portion of said housing adapted to cooperate with said housing to maintain the abutment on the end portion of the arm in locked position in said housing, said resilient means including means adapted to be manually manipulated to release said abutment from its locked position and permit withdrawal of the end of the arm from said housing, the depending side walls of the forward portion of said integral member having aligned apertures, means for releasably maintaining a portion of the pin engaged in the aligned apertures of the depending side walls of the outer portion of the integral member and locked against transverse displacement from said apertures, another portion of the pin extending transversely outwardly beyond the aligned apertures in the side walls of the depending sides of the uppermost portion of the arm pressure distributing assembly of the wiper blade and being shaped to fit into said last-mentioned aligned apertures and to cooperate with the means on the blade for releasably maintaining the pin against transverse displacement, said pin being adapted to be received reversibly in the aligned apertures of the forward portion of the integral member.

References Cited

UNITED STATES PATENTS

| | | | |
|---|---|---|---|
| 3,147,506 | 9/1964 | Williams | 15—250.32 |
| 3,163,877 | 1/1965 | Wubbe | 15—250.32 |
| 3,378,874 | 4/1968 | Scinta | 15—250.32 |

PETER FELDMAN, Primary Examiner